(12) United States Patent
Prabhakaran et al.

(10) Patent No.: US 10,274,920 B2
(45) Date of Patent: Apr. 30, 2019

(54) METHOD AND SYSTEM FOR DETERMINING ENERGY SAVINGS TARGET FOR DISTRIBUTED SITES OF AN ENTITY

(71) Applicant: CARRIER CORPORATION, Jupiter, FL (US)

(72) Inventors: Baburaj Kaimalilputhenpura Prabhakaran, Calicut (IN); Har Amrit Pal Singh Dhillon, Gurgaon (IN)

(73) Assignee: CARRIER CORPORATION, Jupiter, FL (US)

( * ) Notice: Subject to any disclaimer, the term of this patent is extended or adjusted under 35 U.S.C. 154(b) by 152 days.

(21) Appl. No.: 15/444,295

(22) Filed: Feb. 27, 2017

(65) Prior Publication Data

US 2018/0120803 A1    May 3, 2018

(30) Foreign Application Priority Data

Oct. 30, 2016 (IN) .............................. 201641037195

(51) Int. Cl.
  *G05B 19/042* (2006.01)
  *G06Q 10/00* (2012.01)
  *G06Q 10/06* (2012.01)
  *G06Q 50/06* (2012.01)

(52) U.S. Cl.
  CPC ......... *G05B 19/0428* (2013.01); *G06Q 10/00* (2013.01); *G06Q 10/06* (2013.01); *G06Q 50/06* (2013.01); *G05B 2219/25289* (2013.01); *Y02P 90/82* (2015.11)

(58) Field of Classification Search
  CPC ...... G05B 19/0428; G05B 2219/25289; G06Q 10/00; G06Q 10/06; G06Q 50/06

USPC .......................................................... 700/291
  See application file for complete search history.

(56) References Cited

U.S. PATENT DOCUMENTS

| 909,274 A | 1/1909 | Zieme | |
|---|---|---|---|
| 4,261,037 A * | 4/1981 | Hicks | G06Q 50/06 324/103 R |
| 6,553,418 B1 * | 4/2003 | Collins | H04L 29/06 307/31 |
| 6,633,823 B2 * | 10/2003 | Bartone | H02J 3/14 700/295 |

(Continued)

OTHER PUBLICATIONS

European Search Report for application EP 17199234, dated Dec. 13, 2017, 8 pages.

*Primary Examiner* — Chun Cao
(74) *Attorney, Agent, or Firm* — Cantor Colburn LLP (57) ABSTRACT

Disclosed herein is method and system for determining energy savings target for distributed sites of an entity. Energy profiles of the distributed sites in a service window are identified. Energy coefficients related to the energy profiles are determined by performing optimization of values of operational parameters of the distributed sites. Energy consumption within the service window is predicted using modular transformation of the energy coefficients. Finally, the energy savings target is determined based on modular transformation of the energy coefficients and current energy savings of the distributed sites. The present disclosure discloses a unique framework for defining a generic set of operational energy savings strategies that are applicable to each type of asset and service window of the distributed sites of an entity.

15 Claims, 5 Drawing Sheets

(56) References Cited

U.S. PATENT DOCUMENTS

| | | | |
|---|---|---|---|
| 8,321,188 B2* | 11/2012 | Johnson | G06Q 10/06 |
| | | | 703/6 |
| 8,543,343 B2* | 9/2013 | Jones | G06F 17/5004 |
| | | | 702/60 |
| 2006/0065750 A1* | 3/2006 | Fairless | F23N 5/203 |
| | | | 236/46 R |
| 2011/0130886 A1* | 6/2011 | Drees | G05B 15/02 |
| | | | 700/291 |
| 2012/0310416 A1 | 12/2012 | Tepper et al. | |
| 2014/0229027 A1 | 8/2014 | Dhillon et al. | |
| 2014/0282172 A1 | 9/2014 | Bull et al. | |
| 2016/0154417 A1* | 6/2016 | Sloop | G05B 15/02 |
| | | | 700/291 |
| 2016/0171403 A1 | 6/2016 | Shen et al. | |
| 2017/0207523 A1* | 7/2017 | Eden | H05H 1/2406 |

* cited by examiner

METHOD AND SYSTEM FOR DETERMINING ENERGY SAVINGS TARGET FOR DISTRIBUTED SITES OF AN ENTITY

This application claims the benefit of Indian Patent Application Serial No. 201641037195, filed Oct. 16, 2016, which is hereby incorporated by reference in its entirety.

FIELD

The present subject matter is related, in general to energy conservation, and more particularly, but not exclusively to a method and system for determining energy savings target for one or more distributed sites of an entity.

BACKGROUND

Currently, energy savings from various energy conservation projects is measured and verified using an International Performance Measurement and Verification Protocol (IPMVP) framework. The IPMVP was developed by a coalition of international organizations (led by the United States Department of Energy) in 1994-1995. Now, the IPMVP has become a national measurement and verification standard in some of the countries, including the United States, and has been translated into 10 languages. The IPMVP framework offers four specific options for quantifying the energy savings. The IPMVP suggests best practices for quantifying the results of energy efficiency investments. The IPMVP also helps in increasing investments in energy and water management, demand management and renewable energy projects.

The specific options provided by the IPMVP framework for estimating the energy consumption/savings in a site (A, B, C and D) are summarized as shown below:

a. Option (A): Retrofit Isolation: Key Parameter Measurement:

Here, the energy savings are determined by field measurement of the key performance parameter(s) which defines the energy use of the energy conservation measure's (ESS) affected system(s) and/or the success of the project. The energy estimates are derived based on historical data, manufacturer's specifications, or engineering judgment. Documentation of the source or justification of the estimated parameter is required. Typical applications of performing retrofit isolation of key parameters may include a lighting retrofit, where the power drawn can be monitored and hours of operation can be estimated.

b. Option (B): Retrofit Isolation: All Parameter Measurement:

Here, the energy savings are determined by field measurement of all the key performance parameters which define the energy use of the ESS-affected system. Typical applications may include a lighting retrofit where both power drawn and hours of operation are recorded.

c. Option (C): Whole Facility:

Here, the energy savings are determined by measuring energy use at the whole facility or sub-facility level. This approach is likely to require a regression analysis or similar to account for independent variables such as outdoor air temperature, for example. Typical examples may include measurement of a facility where several ESSs have been implemented, or where the ESS is expected to affect all equipment in a facility.

d. Option (D): Calibrated Simulation:

Here, the energy savings are determined through simulation of the energy use of the whole facility, or of a sub-facility. Simulation routines are demonstrated to adequately model actual energy performance measured in the facility. This Option usually requires considerable skill in calibrated simulation. Typical applications may include measurement of a facility where several ESSs have been implemented, but no historical energy data is available.

However, IPMVP methodologies summarized above are best suited only for those retrofits in which some assets are replaced or modified. Instead, the retrofits in which energy savings are generated purely on account of operational ESS, like schedule management, set-point management, asset performance management, capacity management etc., the above methodologies are not suitable.

Also, the IPMVP methodologies may not be suitable for estimation of energy consumption in the distributed sites that involve variations in several other parameters like sales, age of the asset, ambient temperature, operating hours in different day of week etc. Further, in certain circumstances, the energy consumption across the distributed sites may go up due to higher business intensity in the service window irrespective of the energy control measures.

The challenges mainly faced during determining energy savings target for the distributed sites of an entity includes generating energy coefficients associated with an energy profile of the distributed sites and computing energy savings across the distributed based on the energy coefficients and adjustment factors.

SUMMARY

Disclosed herein is a method for determining energy savings target for one or more distributed sites of an entity. The method comprises identifying, by an energy savings prediction system, one or more energy profiles at each of one or more distributed sites by defining a service window and one or more energy control measures associated with the service window. Values of each of one or more operational parameters are determined for a baseline period against a target reporting period in each of the one or more energy profiles. Upon determining the values of the one or more operational parameters, one or more energy coefficients are computed by performing one or more energy optimization techniques on the values of each of the one or more operational parameters. Further, energy consumption in the service window is predicted by performing modular transformation of the one or more energy coefficients. A current energy savings value at each of the one or more distributed sites is computed based on the energy consumption thus predicted and one or more adjustment factors. Finally, the energy savings target for each of the one or more distributed sites is determined by performing the modular transformation of the one or more energy coefficients when compared with the current energy savings.

Further, the present disclosure discloses an energy savings prediction system for determining energy savings target for one or more distributed sites of an entity. The energy savings prediction system comprises a processor and a memory. The memory is communicatively coupled to the processor and stores processor-executable instructions, which, on execution, causes the processor to identify one or more energy profiles at each of one or more distributed sites by defining a service window and one or more energy control measures associated with the service window. Upon identifying the one or more energy profiles, values of each of one or more operational parameters are determined for a baseline period against a target reporting period in each of the one or more energy profiles. The processor computes one or more energy coefficients by performing one or more energy optimization techniques on the values of each of the one or more operational parameters. Further, the processor predicts energy consumption in the service window by performing modular transformation of the one or more energy coefficients. Furthermore, the processor computes current energy savings at each of the one or more distributed sites based on the energy consumption thus predicted and one or more adjustment factors. Finally, the processor determines the energy savings target for each of the one or more distributed sites by performing the modular transformation of the one or more energy coefficients when compared with the current energy savings.

In another embodiment, a non-transitory computer-readable storage medium for creating a multicast group is disclosed, which when executed by a computing device, cause the computing device to perform operations including identifying one or more energy profiles at each of one or more distributed sites by defining a service window and one or more energy control measures associated with the service window. Upon identifying the one or more energy profiles, values of each of one or more operational parameters are determined for a baseline period against a target reporting period in each of the one or more energy profiles. The operations include computing one or more energy coefficients by performing one or more energy optimization techniques on the values of each of the one or more operational parameters. Further, the processor predicts energy consumption in the service window by performing modular transformation of the one or more energy coefficients. Furthermore, the operations include computing current energy savings at each of the one or more distributed sites based on the energy consumption thus predicted and one or more adjustment factors. Finally, the operations include determining the energy savings target for each of the one or more distributed sites by performing the modular transformation of the one or more energy coefficients when compared with the current energy savings.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an energy savings prediction system for determining energy savings target for one or more distributed sites of an entity. The energy savings prediction system of the present disclosure computes and compiles the energy savings at a site, rolling up into a network of distributed sites, using a bottom-to-top approach. The energy savings prediction system is a unique model framework for depicting the energy consumption across the network of distributed sites. The system defines a baseline period and one or more consecutive reporting periods for computing the energy savings across the distributed sites by performing modular transformation of energy coefficients associated with a service window of the distributed sites. The energy coefficients associated with the service window may be computed by leveraging predetermined local and global energy estimation processes in the baseline period and the reporting period.

The energy savings prediction system defines a set of operational Energy Savings Strategies (ESS) that are applicable for each service window and each type of asset/ instrumentation within the distributed sites. The system leverages the ESS onto the service window of the distributed sites and achieves energy control measures through schedule management, set-point management, asset performance management, capacity management etc. Further, the energy savings prediction system may also deploy instrumentation such as, energy meters, temperature sensors, thermostats etc. onto the distributed sites in order to measure and record parameter changes like energy consumption rate, temperature and operational parameters.

In an embodiment, the method and the energy savings prediction system of the present disclosure may define a set of site-level operational override solutions to meet the business needs of the distributed sites when some of the operational savings measures in the distributed sites have to be disabled. The energy savings prediction system achieves the site-level operational overrides by applying various adjustment factors in the consecutive reporting periods of the distributed sites, thereby clearly distinguishing the energy effects of the energy control measures from the energy effects resulting from other simultaneous changes in the distributed sites.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
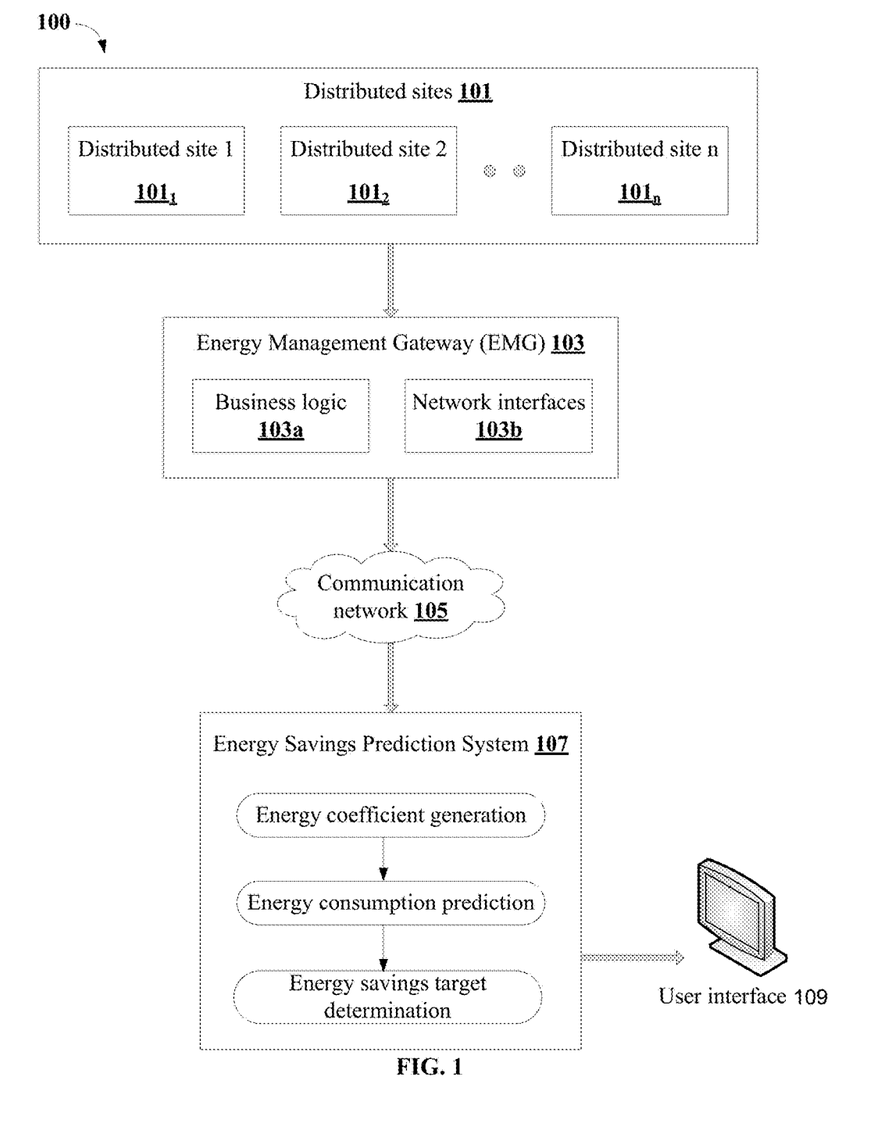
FIG. 1 shows an exemplary environment for determining energy savings target for one or more distributed sites of an entity using an energy savings prediction system in accordance with some embodiments of the present disclosure.

FIG. 1 shows an exemplary environment for determining energy savings target for one or more distributed sites of an entity using an energy savings prediction system in accordance with some embodiments of the present disclosure.

Accordingly, the environment 100 comprises one or more distributed sites 101, distributed site 1 101$_1$ to distributed site n 101$_n$ (collectively referred as distributed sites 101) of an entity, an Energy Management Gateway (EMG) 103 and an energy savings prediction system 107. The EMG 103 may be configured with a business logic 103$a$ and network interfaces 103$b$. The business logic 103$a$ may include set of real-world business rules and strategies that determine the business related operations of the entity. In an embodiment, each of the one or more distributed sites 101 of the entity may be adapted to different set of business rules based on the business requirements at the one or more distributed sites 101.

The network interfaces 103$b$ are used to establish a communication between the EMG 103 and the energy savings prediction system 107 through the communication network 105. As an example, the one or more network interfaces 103$b$ may include, without limiting to, wireless communication interfaces like Wi-Fi, Zig Bee, along with packet oriented mobile network services like GSM/GPRS, wired communication interfaces like Ethernet and so forth. The communication network 105 may be one of a wired communication line, wireless communication channel or any combination thereof, that enable communication between the EMG 103 and the energy savings prediction system 107.

In an embodiment, the energy savings prediction system 107 may receive data related to one or more operational parameters from the one or more distributed sites 101 through the EMG 103 and communication network 105. As an example, the one or more operational parameters include, without limiting to, rate of energy consumption at each of the distributed sites 101, business volume of each of the distributed sites 101, weather related data, equipment usage data, operational manuals of the one or more distributed sites 101 and so forth. Upon receiving the data related to the one or more operational parameters, the energy savings prediction system 107 may generate one or more energy coefficients 213 by performing one or more energy optimization techniques on the values of each of the one or more operational parameters. Further, the energy savings prediction system 107 may predict energy consumption in a service window of the one or more distributed sites 101 by performing modular transformation of the one or more energy coefficients 213. Finally, the energy savings prediction system 107 determines the energy savings target for each of the one or more distributed sites 101 by performing the modular transformation of the one or more energy coefficients 213 when compared with a current energy savings value across the one or more distributed sites 101. In an embodiment, the energy savings prediction system 107 may display various information, including the values of the energy consumption and energy savings target, on a display interface associated with the energy savings prediction system 107.

Figure 2A:
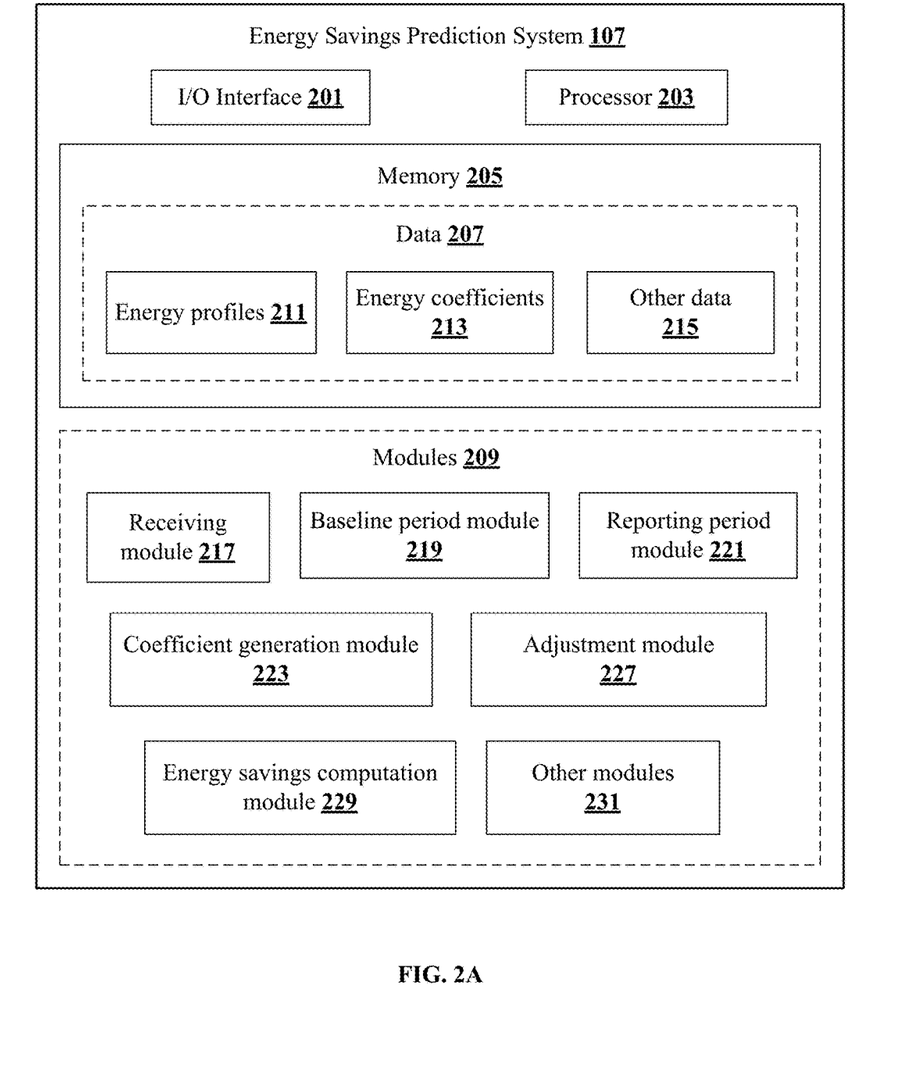
FIG. 2A shows a detailed block diagram illustrating the energy savings prediction system in accordance with some embodiments of the present disclosure.

FIG. 2A shows a detailed block diagram illustrating the energy savings prediction system in accordance with some embodiments of the present disclosure.

The energy savings prediction system 107 comprises an I/O interface 201, a processor 203 and a memory 205. The I/O interface 201 may be configured to receive the one or more operational parameters from the one or more distributed sites 101 through the communication network 105. The memory 205 may be communicatively coupled to the processor 203. The processor 203 may be configured to perform one or more functions of the energy savings prediction system 107 for determining the energy savings target for the one or more distributed sites 101. In an implementation, the energy savings prediction system 107 may comprise data 207 and modules 209 for performing various operations in accordance with the embodiments of the present disclosure. In an embodiment, the data 207 may be stored within the memory 205 and may include, without limiting to, one or more energy profiles 211 associated with the one or more distributed sites 101, the one or more energy coefficients 213 and other data 215.

In one embodiment, the data 207 may be stored within the memory 205 in the form of various data structures. Additionally, the aforementioned data 207 may be organized using data models, such as relational or hierarchical data models. The other data 215 may store data, including temporary data and temporary files, generated by modules 209 while performing the various functions of the energy savings prediction system 107.

In an embodiment, the one or more energy profiles 211 associated with the one or more distributed sites 101 are identified by the energy savings prediction system 107 by mapping a service window associated with each of the one or more distributed sites 101 with the one or more distributed sites 101 based on operating schedule of each of the one or more distributed sites 101. The service window is a framework that helps in identifying the unique energy profiles 211 that each of the one or more distributed sites 101 go through during their operation. The energy profiles 211 of each of the one or more distributed sites 101 are a result of the business volume, weather, equipment usage, operational menu etc. operational parameters associated with the one or more distributed sites 101. As an example, the energy profile 211 for a construction site may include patterns/timelines of different operations in the construction site, such as crew set-up, breakfast, pre-lunch, lunch, post-lunch and dinner. Similarly, the energy profile 211 for a bank may include details of bank set-up hours, customer hours, closing hours and maintenance hours of the bank. In an embodiment, the energy profiles 211 associated with each of the one or more distributed sites 101 may be different and defined based on business requirements across each of the one or more distributed sites 101.

In an embodiment, the one or more energy coefficients 213 are computed by the energy savings prediction system 107 by performing one or more energy optimization techniques on the values of each of the one or more operational parameters. As an example, the one or more energy optimization techniques used for computing the one or more energy coefficients 213 may be a local optimization technique such as Least Squares (LS) optimization or a global optimization technique such as Principle Component Analysis (PCA). In an embodiment, the energy savings prediction system 107 leverages the one or more energy optimization techniques on the historic and/or current values of the one or more operational parameters.

In an embodiment, the data 207 may be processed by one or more modules 209 of the energy savings prediction system 107. In one implementation, the one or more modules 209 may be stored as a part of the processor 203. In another implementation, the one or more modules 209 may be communicatively coupled to the processor 203 for performing one or more functions of the energy savings prediction system 107. The modules 209 may include, without limiting to, a receiving module 217, a baseline period module 219, a reporting period module 221, a coefficient generation module 223, an adjustment module 227, an energy savings computation module 229 and other modules 231.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 231 may be used to perform various miscellaneous functionalities of the energy savings prediction system 107. It will be appreciated that such aforementioned modules may be represented as a single module or a combination of different modules.

In an embodiment, the receiving module 217 may be responsible for receiving the data related to the one or more operational parameters from the one or more distributed sites 101. In an implementation, the receiving module 217 may communicate with a data measurement component (not shown in figures), deployed at each of the one or more distributed sites 101, to receive the data related to the one or more operational parameters through the communication network 105. The data measurement component may be configured to record and transmit the values of the one or more operational parameters required for computing and determining the energy savings target. The data measurement component may collect the values of the one or more operational parameters from various instruments including energy monitoring/relay devices, grid meters, Distributed Generation (DG) meters, temperature sensors/transducers and so forth that are deployed in each of the one or more distributed sites 101.

In some embodiment, the receiving module 217 may receive the data related to the one or more operational parameters in the form of data packets using TCP/IP data transmission protocol. Further, the receiving module 217 may translate the received data, which is in the hexadecimal data format, to a user-readable data format. Then the translated data are stored in the energy savings prediction system 107 for defining values of the one or more operational parameters during a baseline period against a target reporting period.

In an embodiment, the baseline period module 219 may be responsible for defining a baseline period for determining the values of the one or more operational parameters. The baseline period for each of the one or more distributed sites 101 may be configurable individually based on the operational schedule of the one or more distributed sites 101. Initially, the baseline period module 219 may identify the historic values of the one or more operational parameters over a predetermined period of operation, for example, one year. Then, the baseline period module 219 may normalize the identified values of the one or more operational parameters into a predefined time period using modular transfer functions 235 and coefficients of the modular transfer functions 235. As an example, the predefined time period of normalization may be in terms of number of months, weeks or days of operation of the one or more distributed sites 101. In an embodiment, the baseline period module 219 may compute sales/guest count data over the predefined time period from daily or weekly format.

In an embodiment, the reporting period module 221 may be responsible for defining a target reporting period, against which the values of each of one or more operational parameters for the baseline period have to be determined. Similar to the baseline period, the reporting period for each of the one or more distributed sites 101 may be configurable individually based on the operational schedule of the one or more distributed sites 101. Initially, the reporting period module 221 may identify the current values of the one or more operational parameters across each of the one or more distributed sites 101. Then, the reporting period module 221 may normalize the identified values of the one or more operational parameters into a predefined time period using modular transfer functions 235 and coefficients of the modular transfer functions 235. As an example, the predefined time period of normalization may be in terms of number of months, weeks or days of operation of the one or more distributed sites 101. In an embodiment, the reporting period module 219 may compute sales/guest count data over the predefined time period from daily or weekly format.

In an embodiment, both the baseline period module 219 and the reporting period module 221 may consider total number of days that the one or more distributed sites 101 were shut down or no operations were performed, during normalization of the identified data. Consideration of the discretionary shut down days of the one or more distributed sites 101 helps in accurate calculations of the values of energy consumption and energy savings at each of the one or more distributed sites 101.

In an embodiment, coefficient generation module 223 may be responsible for generating and computing the one or more energy coefficients 213 associated with the energy profiles 211 of the one or more distributed sites 101. In some embodiment, the coefficients generation module 223 may generate the one or more energy coefficients 213 by iteratively minimizing Euclidean distance between the actual value as well as the predicted values of the energy consumption/savings.

In an embodiment, the coefficient generation module 223 may take the values of the one or more operational parameters in the baseline period and the reporting period and perform one or more local and/or global optimization techniques to estimate the one or more energy coefficients 213 related to the one or more operational parameters. As an example, the initial estimation of the one or more energy coefficients 213 may be derived using the local optimization technique such as, the Least Square (LS) regression optimization technique. Further, the initial estimation of the one or more energy coefficients 213 may be further refined by using a fitness function or a gradient solving technique like Newton Raphson method to estimate the one or more energy coefficients 213.

In an embodiment, the coefficient generation module 223 may converge the one or more energy coefficients 213 to a local minimum value before further optimizing the one or more energy coefficients 213 using the global optimization tools such as Particle Swarm Optimization (POS). The POS optimization may be performed using the coefficients from the gradient solver technique as an initial guess to ensure that the one or more energy coefficients 213 are converged to a global minimum and a least residual values.

In an embodiment, the adjustment module 227 may be responsible for determining the values corresponding to the one or more adjustment factors that have to be considered while predicting the energy consumption value across each of the one or more distributed sites 101. As an example, the one or more adjustment factors include at least one of manual override adjustment factor, back failure control adjustment factor, operating schedule adjustment factor and out of boundary adjustment factor, which are explained in detail in the below paragraphs:

a. Manual Override Adjustments:

Because of the site-specific business requirements, some of the operational measures may have to be disabled for a predetermined time period. For this, each of the one or more distributed sites 101 may be provided with a physical/manual override component to override the operational efficiency measures for the predetermined time period for required asset groups like lighting. The manual override component may be purely based on the site manager's discretion. The energy consumption that happens because of the manual override has to be factored from each reporting period as an adjustment.

b. Control Back Failure Adjustments:

The control back failure adjustments have to be performed when the site-level controls fail because of issues, for example, break-down of instruments in the site. In such situations, the energy consumption because of the control back failure have to be factored as adjustments while computing the energy savings value.

c. Operating Schedule Adjustments:

Any changes in the business schedules of the one or more distributed sites 101, for example, major changes in the site's business hours, may have to be taken into account while computing the energy consumption/savings values for the one or more distributed sites 101.

d. Out of Boundary Adjustments:

Significant additions or modifications in out of boundary loads, for example, power consumption from an isolated meter, have to be considered as adjustment to the baseline energy consumption values for an accurate estimation of the energy consumption across each of the one or more distributed sites 101.

In an embodiment, the one or more adjustments have to be carried out in order to segregate the energy effects of one of the energy savings measures from the effects of other simultaneous changes affecting the values of energy consumption and/or savings across the one or more distributed sites 101. Thus, the adjustment module 227 helps the energy savings prediction system 107 to adapt to the routine and non-routine based adjustments factors that are disclosed above.

In an embodiment, the energy savings computation module 229 may be responsible for computing current energy savings at each of the one or more distributed sites 101 based on the energy consumption at each of the one or more distributed sites 101 and one or more adjustment factors. The energy consumption at each of the one or more distributed sites 101 may be computed by performing modular transformation of the one or more energy coefficients 213. Equation (1) below is an exemplary illustration of computation of monthly energy consumption in one of the distributed sites 101.

$$\text{Monthly energy consumption(in kWh)} = C0[1 + D1*\text{Guest count} + E1(\text{Current year} - \text{Base year})] + \{C1*\text{CDD}[1 + D2*\text{Guest count}] + C2*\text{CDD}^2\} + \{C3*\text{HDD}[1 + D3*\text{Guest count}] + C4*\text{HDD}^2\} \quad (1)$$

Where, C0, C1, C2, C3, C4, D1, D2, D3 and E1 represent energy coefficients associated with the distributed site 101. Each of these energy coefficients may be computed using one or more local and/or global optimization techniques. The parameters 'CDD' and 'HDD' in equation (1) indicate the energy consumption variations with respect to Cooling Degree Days (CDD) and Heating Degree Days (HDD) at the distributed site 101.

In an embodiment, upon computing the energy consumption values, the energy savings computation module 229 may compute energy savings for each service window of the one or more distributed sites 101 on single day basis and then compute the total energy savings based on the number of weekdays in the reporting period of each of the one or more distributed sites 101. In an embodiment, the energy savings for each of the one or more distributed sites 101 may be calculated using the following equation:

$$\text{Energy Savings} = (\text{Energy consumption at baseline period} - \text{Energy consumption at reporting period}) \pm \text{Adjustments factors} \quad (2)$$

The energy savings computation module 229 may collect and compile the energy savings of each of the one or more distributed sites 101 for a number of reporting periods based on different levels, for example enterprise level, cluster/city level, site level and asset level, in the one or more distributed sites 101. The collected energy savings values of the one or more distributed sites 101 may be used for determining the energy savings target for each of the one or more distributed sites 101. In an embodiment, the energy savings computation module 229 determines the energy savings target for each of the one or more distributed sites 101 by performing the modular transformation of the one or more energy coefficients 213 when compared with the energy savings at each of the one or more distributed sites 101 over a number of reporting periods.

In an embodiment, the energy savings computation module 229 may be communicably coupled to a User Interface (UI) 109 for displaying various information comprising, without limiting to, the energy consumption values at each of the one or more distributed sites 101, the current energy savings value and the energy savings target for each of the one or more distributed sites 101. The UI 109 may display the above information in various display formats such as, tables, pie charts, trends, and graphs and may allow the users to download the displayed information for future use. The information being displayed on the UI 109 may be categorized as per different levels in the one or more distributed sites 101. In an embodiment, the UI 109 may also be configured to provide one or more energy savings recommendations to the user. As an example, the UI 109 may indicate/highlight a critical energy control measure from the information being displayed, in order to draw the attention of the users onto the critical energy control measure. In an implementation, the UI 109 may be configured within the energy savings prediction system 107.

Figure 2B:
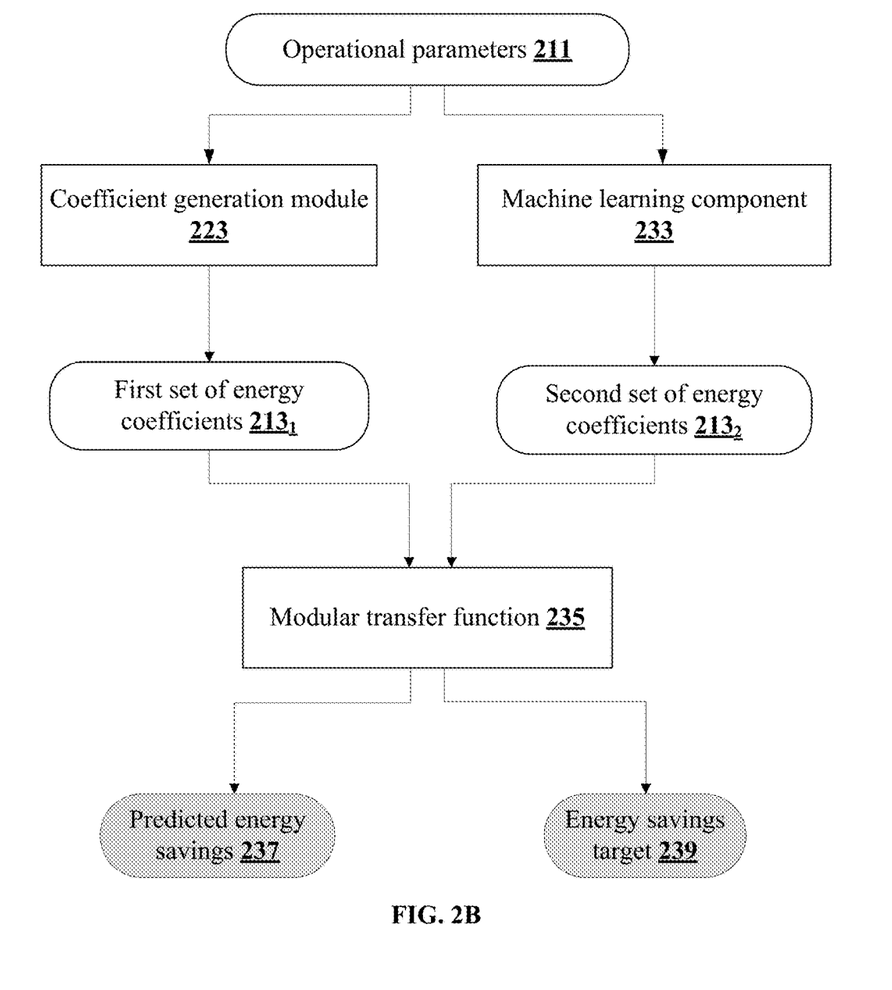
FIG. 2B illustrates a method of determining predicted energy savings and energy savings target using modular transfer function in accordance with some embodiments of the present disclosure.

FIG. 2B illustrates a method of determining predicted energy savings and energy savings target using modular transfer function in accordance with some embodiments of the present disclosure.

The energy savings prediction system 107 determines the values of predicted energy savings 237 and energy savings target 239 for each of the one or more distributed sites 101 by performing the modular transfer function 235 on the one or more energy coefficients 213. In an embodiment, the predicted energy savings 237 may be determined by evaluating a first set of energy coefficients $213_1$, which are generated by the coefficient generation module 223 using the historic and current values of the one or more operational parameters 211 during the baseline period. Similarly, the energy savings target may be obtained by evaluating a second set of energy coefficients $213_2$ that are obtained by performing machine learning techniques on the values of the one or more operational parameters 211 at the reporting period, using the machine learning component 233.

In an embodiment, the machine learning component 233 uses the historic and the current values of the one or more operational parameters data to determine the energy savings target for a pre-set target value. As an example, the pre-set target value may be 10%, which means that the energy savings target is 10% higher than the median energy savings value in the one or more distributed sites 101.

In an embodiment, one or more coefficients of the modular transfer function 235 may be identified by iteratively operating on the initial values of the one or more coefficients. An initial guess on the values of the one or more coefficients is made in order to find the values that are reasonably close to the true root. Then the modular transfer function 235 may be approximated by its tangent line, which may be computed using the tools of calculus, and by computing x-intercept of the tangent line using elementary algebra techniques.

Figure 3:
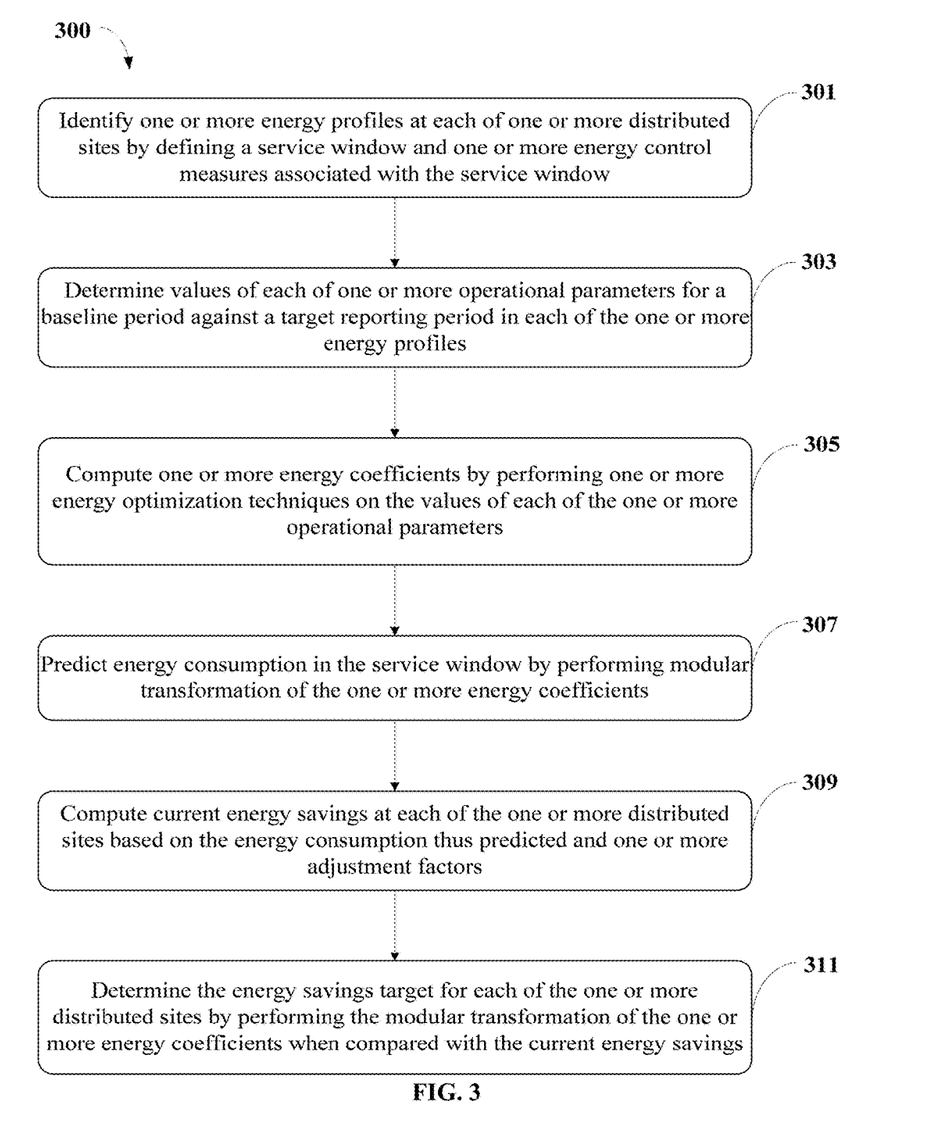
FIG. 3 shows a flowchart illustrating a method for determining the energy savings target for the one or more distributed sites in accordance with some embodiments of the present disclosure.

FIG. 3 shows a flowchart illustrating a method for determining the energy savings target for the one or more distributed sites in accordance with some embodiments of the present disclosure.

As illustrated in FIG. 3, the method 300 comprises one or more blocks for determining energy savings target for one or more distributed sites 101 using an energy savings prediction system 107. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the energy savings prediction system 107 identifies one or more energy profiles 211 at each of one or more distributed sites 101 by defining a service window and one or more energy control measures associated with the service window. In an embodiment, the one or more energy profiles 211 are identified by mapping the service window with each of the one or more distributed sites 101 based on operating schedule of each of the one or more distributed sites 101.

At block 303, the energy savings prediction system 107 determines values of each of one or more operational parameters for a baseline period against a target reporting period in each of the one or more energy profiles 211. As an example, the one or more operational parameters include, without limiting to, rate of energy consumption at each of the distributed sites 101, business volume of each of the distributed sites 101, weather related data, equipment usage data and so forth.

At block 305, the energy savings prediction system 107 computes one or more energy coefficients 213 by performing one or more energy optimization techniques on the values of each of the one or more operational parameters. In an embodiment, the values of each of the one or more operational parameters are normalized to a predefined time period using modular transfer functions 235 and coefficients of the modular transfer functions 235.

At block 307, the energy savings prediction system 107 predicts energy consumption of the one or more distributed sites 101 in the service window by performing modular transformation of the one or more energy coefficients 213. The values of the one or more energy coefficients 213 are updated during each reporting period while predicting the energy consumption.

At block 309, the energy savings prediction system 107 computes a current energy savings at each of the one or more distributed sites 101 based on the energy consumption thus predicted and one or more adjustment factors. In an embodiment, the one or more adjustment factors include at least one of manual override adjustment factor, back failure control adjustment factor, operating schedule adjustment factor and out of boundary adjustment factor.

At block 311, the energy savings prediction system 107 determines the energy savings target for each of the one or more distributed sites 101 by performing the modular transformation of the one or more energy coefficients 213 when compared with the current energy savings. Finally, the energy savings prediction system 107 displays information comprising at least one of energy consumption values at each of the one or more distributed sites 101, the current energy savings value and the energy savings target on a user interface 109 associated with the energy savings prediction system 107.

Computer System

Figure 4:
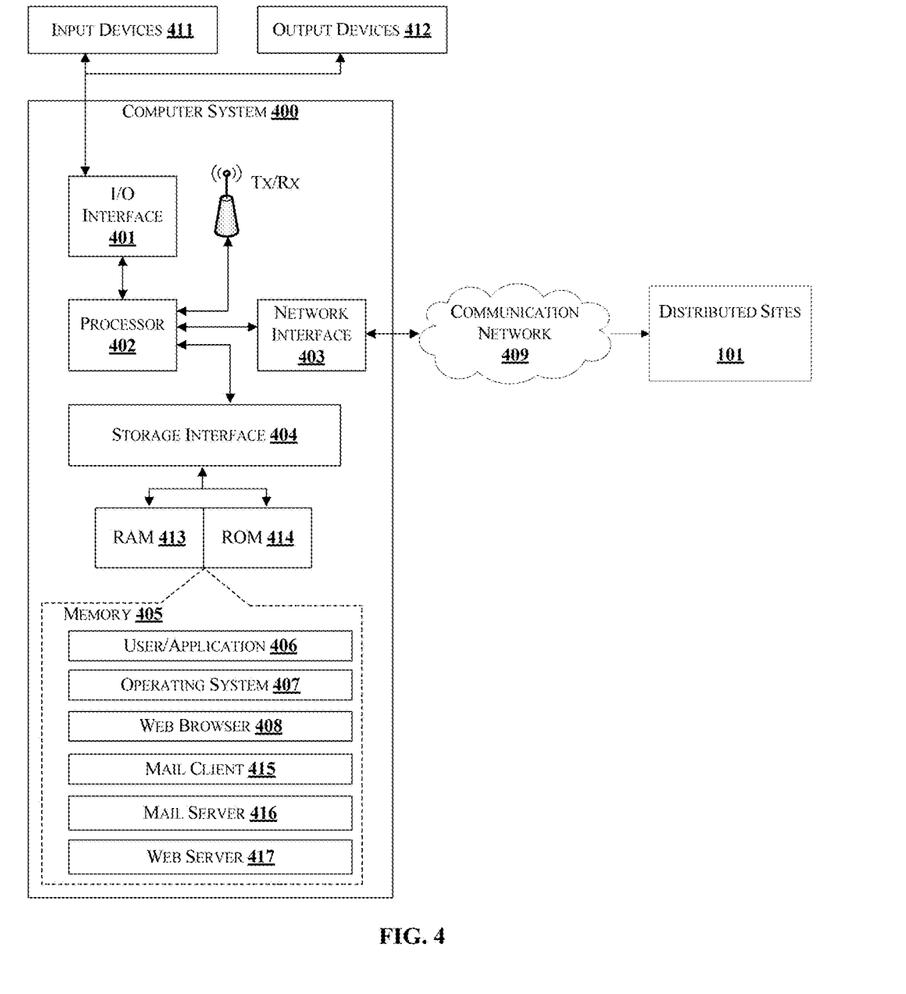
FIG. 4 illustrates a block diagram of an exemplary computer system for implementing embodiments consistent with the present disclosure.

FIG. 4 illustrates a block diagram of an exemplary computer system 400 for implementing embodiments consistent with the present technology. In an embodiment, the computer system 400 may be the energy savings prediction system 107 which is used for determining energy savings target for one or more distributed sites 101 of an entity. The computer system 400 may comprise a central processing unit ("CPU" or "processor") 402. The processor 402 may comprise at least one data processor for executing program components for executing user or system-generated business processes. A user may include a person, a person using a device such as such as those included in this technology, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the one or more distributed sites 101 for collecting/receiving the one or more operational parameters associated with the one or more distributed sites 101. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web server 408 etc. In some embodiments, computer system 400 may store user/application data 406, such as the data, variables, records, etc. as described herein. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present technology. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a system and a method for computing and determining the energy savings for a network of distributed sites, such as different operational branches of a bank, where operational energy efficiency measures are deployed.

In an embodiment, the method of present disclosure helps in tracking the effectiveness of the results of energy control measures performed on the distributed sites over a multi-year period.

In an embodiment, the present disclosure teaches a method for determining routine and/or non-routine based adjustments while performing the energy savings calculations for the distributed sites.

In an embodiment, the method of present disclosure facilitates in determining site level overrides solution and meeting business needs when the operational savings measures on the distributed sites need to be disabled.

In an embodiment, the present disclosure discloses a unique framework to depict the energy consumptions of the distributed sites using transfer functions and local & global estimation processes.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining an energy savings target for distributed sites of an entity, the method comprising:
identifying, by computing device comprising one or more processors, one or more energy profiles at each of one or more distributed sites by defining a service window and one or more energy control measures associated with the service window;
determining, by the computing device, one or more values of each of one or more operational parameters for a baseline period against a target reporting period in each of the one or more energy profiles;
computing, by the computing device, one or more energy coefficients by performing one or more energy optimization techniques on the values of each of the one or more operational parameters;
predicting, by the computing device, energy consumption in the service window by performing a modular transformation of the one or more energy coefficients;
computing, by the computing device, current energy savings at each of the one or more distributed sites based on the energy consumption thus predicted and one or more adjustment factors;
determining, by the computing device, the energy savings target for each of the one or more distributed sites by performing the modular transformation of the one or more energy coefficients when compared with the current energy savings; and
displaying, by the computing device, at least one of a value of energy consumption at each of the one or more distributed sites, the current energy savings, or the energy savings target on a user interface, wherein the user interface is configured to highlight a critical energy control measure from the displayed at least one of a value of energy consumption at each of the one or more distributed sites, the current energy savings, or the energy savings, wherein the user interface is further configured to allow a user of the user interface to download the displayed at least one of a value of energy consumption at each of the one or more distributed sites, the current energy savings, or the energy savings.

2. The method as claimed in claim 1, further comprising identifying, by the computing device, the energy profiles comprising mapping the service window with each of the one or more distributed sites based on an operating schedule of each of the one or more distributed sites.

3. The method as claimed in claim 1 further comprising normalizing, by the computing device, the values of each of the one or more operational parameters to a predefined time period using one or more other modular transfer functions and coefficients of the one or more other modular transfer functions.

4. The method as claimed in claim 1, further comprising updating, by the computing device, the energy coefficients during each reporting period while predicting the energy consumption.

5. The method as claimed in claim 1, wherein the one or more adjustment factors include at least one of a manual override adjustment factor, a back failure control adjustment factor, an operating schedule adjustment factor, or an out of boundary adjustment factor.

6. A computing device comprising:
one or more processors; and a memory communicatively coupled to the processor, wherein the memory stores processor-executable instructions, which, on execution by the processors, cause the processors to:
- identify one or more energy profiles at each of one or more distributed sites by defining a service window and one or more energy control measures associated with the service window;
- determine one or more values of each of one or more operational parameters for a baseline period against a target reporting period in each of the one or more energy profiles;
- compute one or more energy coefficients by performing one or more energy optimization techniques on the values of each of the one or more operational parameters;
- predict energy consumption in the service window by performing a modular transformation of the one or more energy coefficients;
- compute current energy savings at each of the one or more distributed sites based on the energy consumption thus predicted and one or more adjustment factors;
- determine the energy savings target for each of the one or more distributed sites by performing the modular transformation of the one or more energy coefficients when compared with the current energy savings; and
- display at least one of a value of energy consumption at each of the one or more distributed sites, the current energy savings, or the energy savings target on a user interface, wherein the user interface is configured to highlight a critical energy control measure from the displayed at least one of a value of energy consumption at each of the one or more distributed sites, the current energy savings, or the energy savings, wherein the user interface is further configured to allow a user of the user interface to download the displayed at least one of a value of energy consumption at each of the one or more distributed sites, the current energy savings, or the energy savings.

7. The computing device as claimed in claim 6, wherein the processor-executable instructions, when executed by the processors,
further causes the processors to identify the energy profiles and map the service window with each of the one or more distributed sites based on an operating schedule of each of the one or more distributed sites.

8. The computing device as claimed in claim 6,
wherein the processor-executable instructions, when executed by the processors, further causes the processors to normalize the values of each of the one or more operational parameters to a predefined time period using one or more other modular transfer functions and coefficients of the one or more other modular transfer functions.

9. The computing device as claimed in claim 6, wherein the processor-executable instructions, when executed by the processors, further causes the processors to update the energy coefficients during each reporting period while predicting the energy consumption.

10. The computing device as claimed in claim 6, wherein the one or more adjustment factors include at least one of a manual override adjustment factor, a back failure control adjustment factor, an operating schedule adjustment factor, or an out of boundary adjustment factor.

11. A non-transitory computer-readable medium comprising instructions for determining an energy savings target for distributed sites of an entity, which, when executed by one or more processors, cause the processors to perform operations comprising:
- identifying one or more energy profiles at each of one or more distributed sites by defining a service window and one or more energy control measures associated with the service window;
- determining one or more values of each of one or more operational parameters for a baseline period against a target reporting period in each of the one or more energy profiles;
- computing one or more energy coefficients by performing one or more energy optimization techniques on the values of each of the one or more operational parameters;
- predicting energy consumption in the service window by performing a modular transformation of the one or more energy coefficients;
- computing current energy savings at each of the one or more distributed sites based on the energy consumption thus predicted and one or more adjustment factors; and
- determining the energy savings target for each of the one or more distributed sites by performing the modular transformation of the one or more energy coefficients when compared with the current energy savings; and
- displaying at least one of a value of energy consumption at each of the one or more distributed sites, the current energy savings, or the energy savings target on a user interface, wherein the user interface is configured to highlight a critical energy control measure from the displayed at least one of a value of energy consumption at each of the one or more distributed sites, the current energy savings, or the energy savings, wherein the user interface is further configured to allow a user of the user interface to download the displayed at least one of a value of energy consumption at each of the one or more distributed sites, the current energy savings, or the energy savings.

12. The medium of claim 11 wherein the instructions, when executed by the processors, further cause the processors to perform one or more additional operations comprising identifying the energy profiles and map the service window with each of the one or more distributed sites based on an operating schedule of each of the one or more distributed sites.

13. The medium of claim 11, wherein the instructions, when executed by the processors, further cause the processors to perform one or more additional operations comprising normalizing the values of each of the one or more operational parameters to a predefined time period using one or more other modular transfer functions and coefficients of the one or more other modular transfer functions.

14. The medium as claimed in claim 11, wherein the instructions, when executed by the processors, further cause the processors to perform one or more additional operations comprising updating the energy coefficients during each reporting period while predicting the energy consumption.

15. The medium as claimed in claim 11, wherein the one or more adjustment factors include at least one of a manual override adjustment factor, a back failure control adjustment factor, an operating schedule adjustment factor, or an out of boundary adjustment factor.

* * * * *